Figure 1:
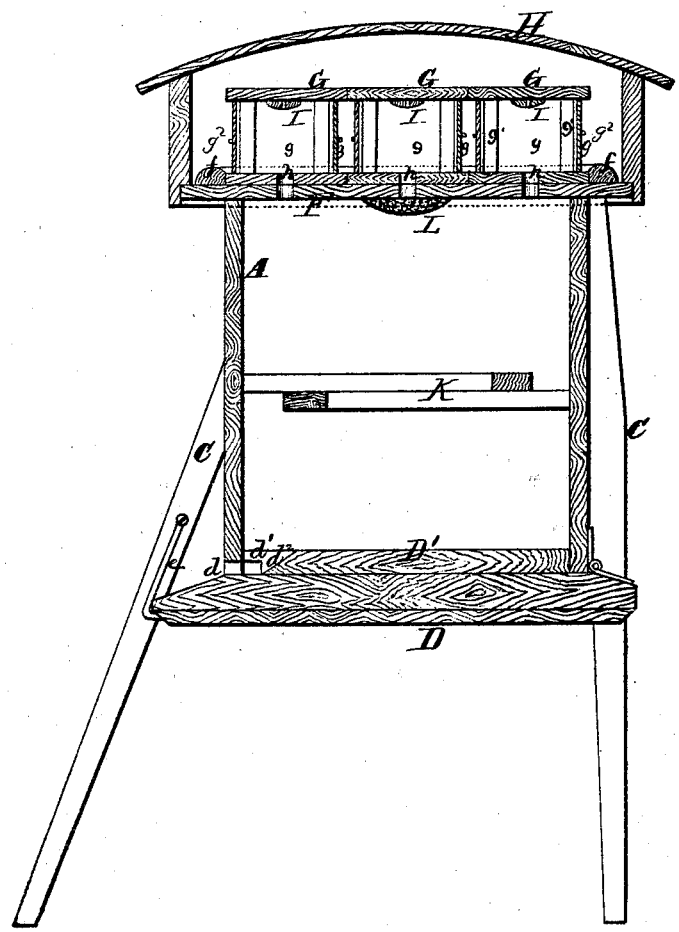

2 Sheets--Sheet 1.

B. F. BUCKLIN.

Improvement in Bee Hives.

No. 122,990.   Patented Jan. 23, 1872.

Witnesses
E. H. Bates
Villette Anderson

Inventor:
B. F. Bucklin
Chipman & Somers & Co
Attys.

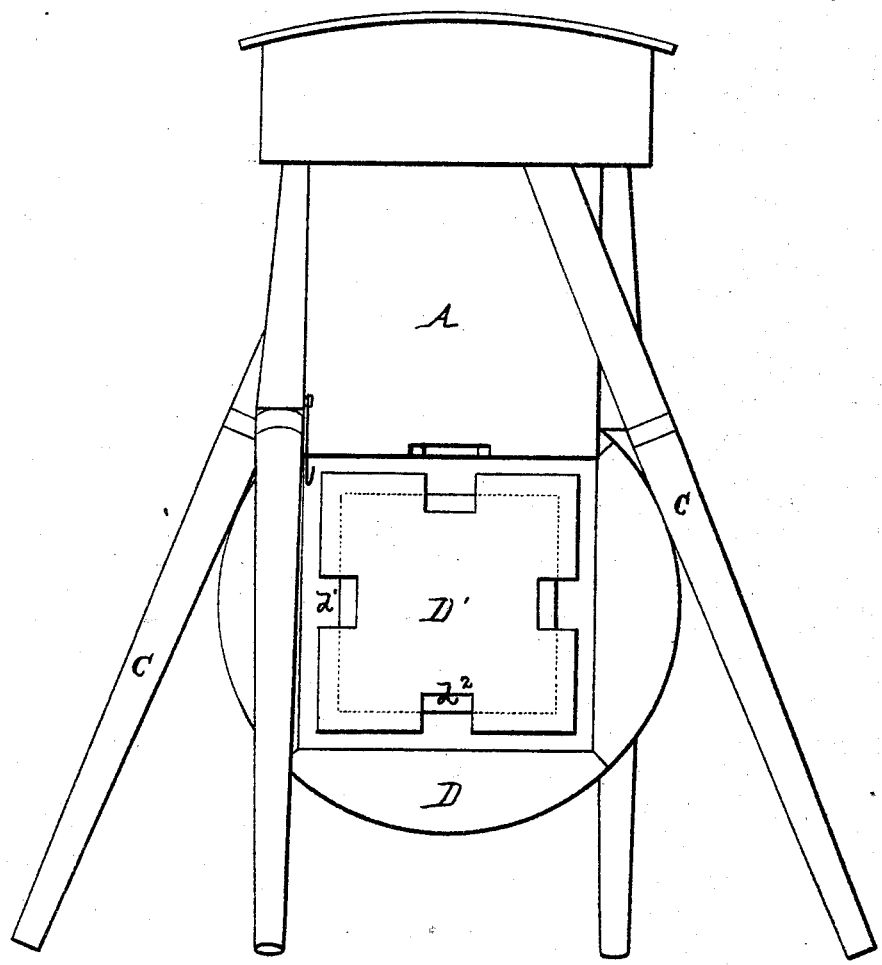

UNITED STATES PATENT OFFICE.

BENJAMIN FRANKLIN BUCKLIN, OF CUYAHOGA FALLS, OHIO.

IMPROVEMENT IN BEE-HIVES.

Specification forming part of Letters Patent No. 122,990, dated January 23, 1872.

*To all whom it may concern:*

Be it known that I, BENJAMIN FRANKLIN BUCKLIN, of Cuyahoga Falls, in the county of Summit and State of Ohio, have invented a new and valuable Improvement in Bee-Hives; and I do hereby declare that the following is a full, clear, and exact description of the construction and operation of the same, reference being had to the annexed drawing making a part of this specification, and to the letters and figures of reference marked thereon.

Figure 1 of the drawing is a vertical section of my invention. Fig. 2 is an inside view of the same, showing the bottom let down.

This invention has relation to certain improvements in bee-hives, and the novelty consists in the construction and improved arrangement of parts as hereinafter described.

Referring to the accompanying drawing, A represents the body of a bee-hive, consisting of a square box. C designates the supports to said hive, consisting of inclined legs, one of which is secured to each side of the body A, and thence extends downward in a diagonal or oblique direction, but on a line parallel to said side. This arrangement of the legs throws them wide apart at their lower ends, making them firmer and preventing the hive from being overthrown by the wind or other accidental causes. These legs are readily adjusted to their proper positions, requiring less work in fitting than the ordinary inclined "bench-leg" supports. The hive A is provided with a circular hinged bottom, D, with its upper surface beveled off on three sides of the hive A, which, at the lower part of said sides, has openings, $d$, cut to let in the bees. These bevels or inclines allow of the more easy removal of foreign bodies by the bees, and serve as lighting-boards. Secured to the upper side of the hinged bottom D is a platform, D′, constructed with projecting ledges, $d^1$, which exactly fit the interior of the box A. In these ledges recesses $d^2$ are cut so as to correspond to the openings $d$ and constitute continuations of them. The back parts of said recesses are beveled, as shown. The passage formed is just sufficient to let the bees pass through, but too small to let larger insects enter. When the bottom D is raised chambers are formed underneath the ledges $d^1$ opening into the passages provided for the entrance of the bees. These chambers are designed as traps to catch millers and like insects and to hinder them from gaining access to the hive. When the bottom is let down the millers fall out. When raised the bottom is supported by means of hooks $e$ hinged to the supports C, or their equivalents. The box A is covered with a partition or floor, F, having projecting sides and a ridge, $f$, around its upper surface. On this floor are placed the honey-boxes G, which are covered by a removable roof, H. The honey-boxes are of the usual form, and have glass sides and ends $g$ attached to the corner posts $g^1$ by means of hooks $g^2$, which may be turned around for the removal of the glass. The honey-boxes have communication with the interior of the hive through the apertures $h$. I designates projections placed in the center of the top of the honey-boxes and designed as cores for the bees to commence building on. The bees will start their combs on such projections in preference to the flat surface of the box; hence when the boxes are filled the appearance of the combs is even and attractive. These projections may be of some light color so that the bees will be more easily attracted toward them. In the interior of the body of the hive are arranged two diagonal bars, K, which cross each other and constitute not only supports to the combs but also as braces to the hive. L indicates a comb-starter attached to the top of the box A. The comb-starters or cores I L may be either plane surfaces or have slight depressions to receive the first layers of comb.

I claim as my invention—

The combination of the circular hinged door D, platform D′, projecting ledges $d^1$, beveled recesses $d^2$, box A, and hooks $e$, as and for the purpose specified.

In testimony that I claim the above I have hereunto subscribed my name in the presence of two witnesses.

BENJAMIN FRANKLIN BUCKLIN.

Witnesses:
 GEO. L. DOW,
 WILBUR STICKLE.